(12) United States Patent
Reardon

(10) Patent No.: US 6,946,767 B2
(45) Date of Patent: Sep. 20, 2005

(54) ALTERNATING CURRENT GENERATOR

(76) Inventor: John Reardon, 184 Tansboro Rd., Berlin, NJ (US) 08009

( * ) Notice: Subject to any disclaimer, the term of this patent is extended or adjusted under 35 U.S.C. 154(b) by 245 days.

(21) Appl. No.: 10/464,219

(22) Filed: Jun. 18, 2003

(65) Prior Publication Data
US 2004/0256938 A1 Dec. 23, 2004

(51) Int. Cl.$^7$ .................. H02K 21/00; H02K 19/00
(52) U.S. Cl. .................................................. 310/159
(58) Field of Search ..................... 310/159, 156.08, 310/156.32, 156.36, 254, 261, 156.02

(56) References Cited

U.S. PATENT DOCUMENTS

| | | | | |
|---|---|---|---|---|
| 4,009,406 A | * | 2/1977 | Inariba | 310/164 |
| 4,823,038 A | * | 4/1989 | Mizutani et al. | 310/257 |
| 5,696,419 A | * | 12/1997 | Rakestraw et al. | 310/268 |
| 5,821,710 A | * | 10/1998 | Masuzawa et al. | 318/254 |
| 5,973,436 A | * | 10/1999 | Mitcham | 310/266 |
| 6,069,431 A | * | 5/2000 | Satoh et al. | 310/260 |
| 6,373,161 B1 | * | 4/2002 | Khalaf | 310/154.02 |
| 6,462,451 B1 | * | 10/2002 | Kimura et al. | 310/156.38 |
| 6,541,877 B2 | * | 4/2003 | Kim et al. | 290/44 |
| 6,717,313 B1 | * | 4/2004 | Bae | 310/156.08 |

* cited by examiner

Primary Examiner—Darren Schuberg
Assistant Examiner—Heba Elkassabgi
(74) Attorney, Agent, or Firm—Stuart M. Goldstein

(57) ABSTRACT

An alternating current electrical generator creates three different and distinct magnetic fields between would coil elements and rotating magnets, two fields of which are induced fields caused by magnet rotation. A plurality of magnets are positioned such that they extend outwardly from a rotating shaft. The magnets are circumferentially spaced around the shaft such that the north polar end of one magnet follows the south polar end of the next magnet or such that the polar end of one magnet follows a magnet with the same polar end. A plurality of stationary coil elements are positioned in spaced relation to the magnets. The coil elements each have electrical windings and metal cores which extend the lengths of the coil elements. The magnets rotate in spaced relation to the ends of the coil elements in such a way that the magnets' flux lines cut the cores located at the center of each of the coil elements. This induces alternating electric current that oscillates back and forth along the lengths of the cores. This oscillating current creates an expanding and collapsing set of magnetic flux lines which expand and contract through every inch of the coil element's windings. This expanding and collapsing magnetic field induces an expanding and collapsing magnetic field and an alternating electric field in the coil elements.

11 Claims, 4 Drawing Sheets

ALTERNATING CURRENT GENERATOR

BACKGROUND OF THE INVENTION

Alternating current generators are rotating devices which convert mechanical energy into electrical energy. To generate an electromotive force by mechanical motion, there must be movement between an electric coil and a magnetic field in a manner that will cause a change in the flux that passes through the coil. Fundamentally, the induced electromotive force is brought about by a change in the flux passing through the coil.

The use of electromagnets, magnets and magnet components in generators to create the magnetic field and its subsequent effect on electric coils to ultimately generate electric current is well known. Such magnetic generators operate by using the repelling forces created by the effect of changing polarities of both permanent and electromagnets. For instance, there are electrical generating devices which employ electromagnets which are fixed in position and which induce current by being selectively energized, as iron or other magnetic metal discs, bars, or similar elements are rotated at or around the magnets. Other systems employ electromagnet or permanent magnets which are rotated, by various means, in relation to iron cores or coils, inducing an alternating electrical current within the coils.

However, prior alternating current generators which employ rotating magnet systems are inefficient and generally fail to deliver adequate current, in relation to the mechanical effort applied.

SUMMARY OF THE INVENTION

It is thus an object of the present invention to address the limitations and disadvantages of prior alternating electric current generators.

It is an object of the present invention to provide an alternating current generator which generates a substantial amount of electrical current efficiently and effectively.

It is a further object of the present invention to provide an alternating current generator which employs rotating magnets to induce increased alternating electrical current within the iron cores of electrical coils.

It is still another object of the present invention to provide an alternating current generator which can be simply and readily manufactured and be operated with high efficiency.

These and other objects are obtained by the present invention, an alternating current electrical generator which creates three different and distinct magnetic fields between wound coil elements and rotating magnets, two fields of which are induced fields caused by magnet rotation. A plurality of magnets are positioned such that they extend outwardly from a rotating shaft. The magnets are circumferentially spaced around the shaft such that the north polar end of one magnet follows the south polar end of the next magnet or such that the polar end of one magnet follows a magnet with the same polar end. A plurality of stationary coil elements are positioned in spaced relation to the magnets. The coil elements each have electrical windings and metal cores which extend the lengths of the coil elements. The magnets rotate in spaced relation to the ends of the coil elements in such a way that the magnets' flux lines cut the cores located at the center of each of the coil elements. This induces alternating electric current that oscillates back and forth along the lengths of the cores. This oscillating current creates an expanding and collapsing set of magnetic flux lines which expand and contract through every inch of the coil element's windings. This expanding and collapsing magnetic field induces an expanding and collapsing magnetic field and an alternating electric field in the coil elements.

The novel features which are considered as characteristic of the invention are set forth in particular in the appended claims. The invention itself, however, both as to its design, construction, and use, together with additional features and advantages thereof, are best understood upon review of the following detailed description with reference to the accompanying drawings.

DETAILED DESCRIPTION OF THE INVENTION

Figure 1:
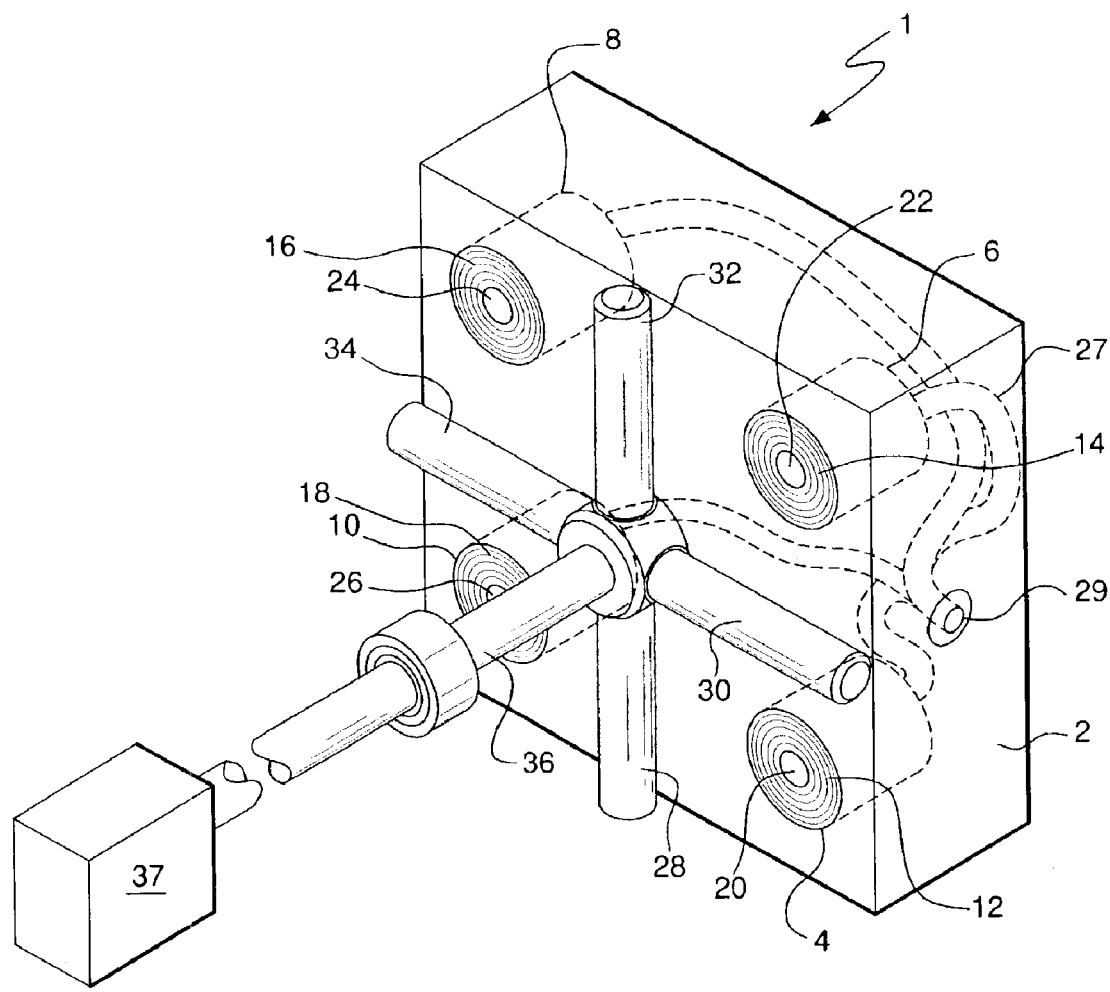
FIG. 1 is an isometric representation of keys components of the present invention.
Figure 2:
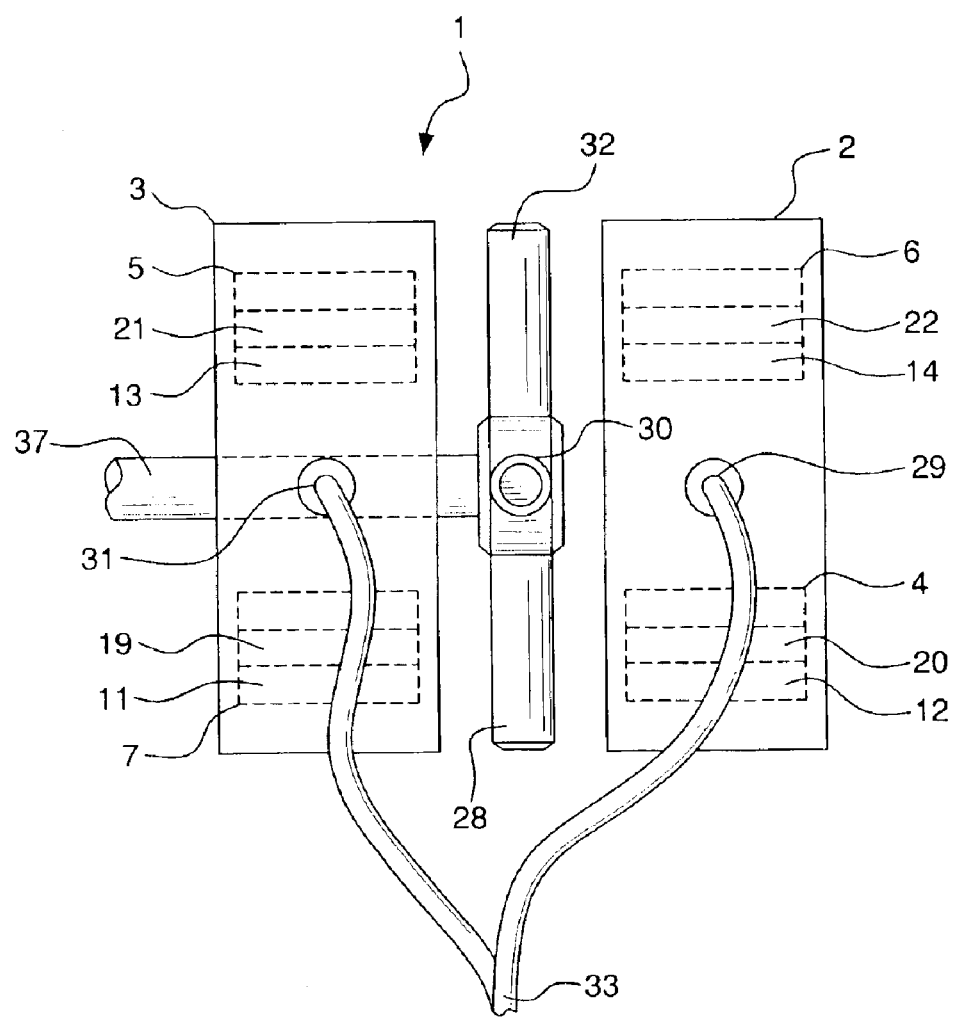
FIG. 2 is a side view representation of the present invention showing the two housed sets of coil elements and their relationship with the magnets.

FIGS. 1 and 2 show a clear depiction of the components of alternating current generator 1 of the subject invention. Generator 1 comprises housings 2 and 3. For simplicity purposes and ease of understanding, only housing 2 is shown in FIG. 1. It must be understood, however, that generator 1 of the present invention is configured for use with both housings 2 and 3. Housing 2 contains coil elements 4, 6, 8 and 10. Each said coil element comprises multiple windings 12, 14, 16, and 18, respectively, wound around inner steel or similar metal cores 20, 22, 24, and 26, respectively. Each steel core extends the full length and directly through each of the coil elements. Coil elements 4, 6, 8, and 10 are mounted within housing 2, such that the end surfaces of the coil elements and the ends of cores 20, 22, 24, and 26 are positioned flush with the external surface of housing 2.

Housing 3 also contains four coil elements positioned identically as has been described with regard to housing 2. Two of these coil elements 5 and 7 are shown in FIG. 2. Coil element 5 has multiple windings 13 and center core 21 and coil element 7 has multiple windings 11 and center core 21.

Magnets 28, 30, 32, and 34 are secured to shaft 36, which is configured to be rotated by conventional power source 37, such as a diesel engine, turbine, etc. Magnets 28, 30, 31, and 32 all have ends with outwardly extending polarities. Magnets 28, 30, 32, and 34 are positioned in spaced relation to the ends of exposed cores 20, 22, 24 and 26 of coil elements 4, 6, 8, and 10 and in spaced relation to the ends of the four exposed cores in the four coil elements located in housing 3, cores 19 and 21 being shown in FIG. 2. All magnets are equidistantly spaced on and around shaft 36, such that the outwardly extending pole of one magnet circumferentially follows the outwardly extending pole of the next magnet. The north polar end of one magnet may follow the south polar end of the next magnet or the polar end of one magnet may follow a magnet with the same polar end.

While four magnets and four cores are shown, it is contemplated that additional magnets and cores could be employed in the generator. Also, while permanent magnets are shown in the drawings, electromagnets could also be used, as they produce the same magnetic flux.

Alternating electrical current is generated when power source 37 rotates shaft 36, thus causing rotation of magnets 28, 30, 32, and 34 in spaced, adjacent relation to the ends of cores 20, 22, 24, and 26 of coil elements 4, 6, 8, and 10, and in spaced, adjacent relation to the ends of cores 19 and 21 of coil elements 7 and 5 and the ends of the cores of the other two similarly aligned coil elements in housing 3. The current which is generated is transmitted through electrical conductive wiring 27, which merges at connection points 29 in housing 2 and 31 in housing 3, for the consolidated transmission at connection point 33 of the electricity produced.

As best represented in FIG. 2, when magnet 28 is rotated in space relation to the end of core 20 of coil element 4, flux lines 100 of the magnet cut the core at the center of the coil element. This induces an alternating electrical current that oscillates back and forth along the length of core 20. This oscillating current creates an expanding and collapsing set of magnetic flux lines 200 which expand and contract through every inch of coil windings 12. Expanding and collapsing field 200 induces an alternating electric field in coil element 4 which is accompanied by an expanding and collapsing magnetic field 300. It is noted, significantly, that none of the magnetic field lines 100, 200 and 300, act in a negative fashion or in an opposing action. This allows the subject invention to overcome the limitations of Lenz's law, which states that whenever there is a change in magnetic flux in a circuit, an induced electromotive force is set-up tending to produce a current in a direction which will oppose the flux change.

Figure 3:
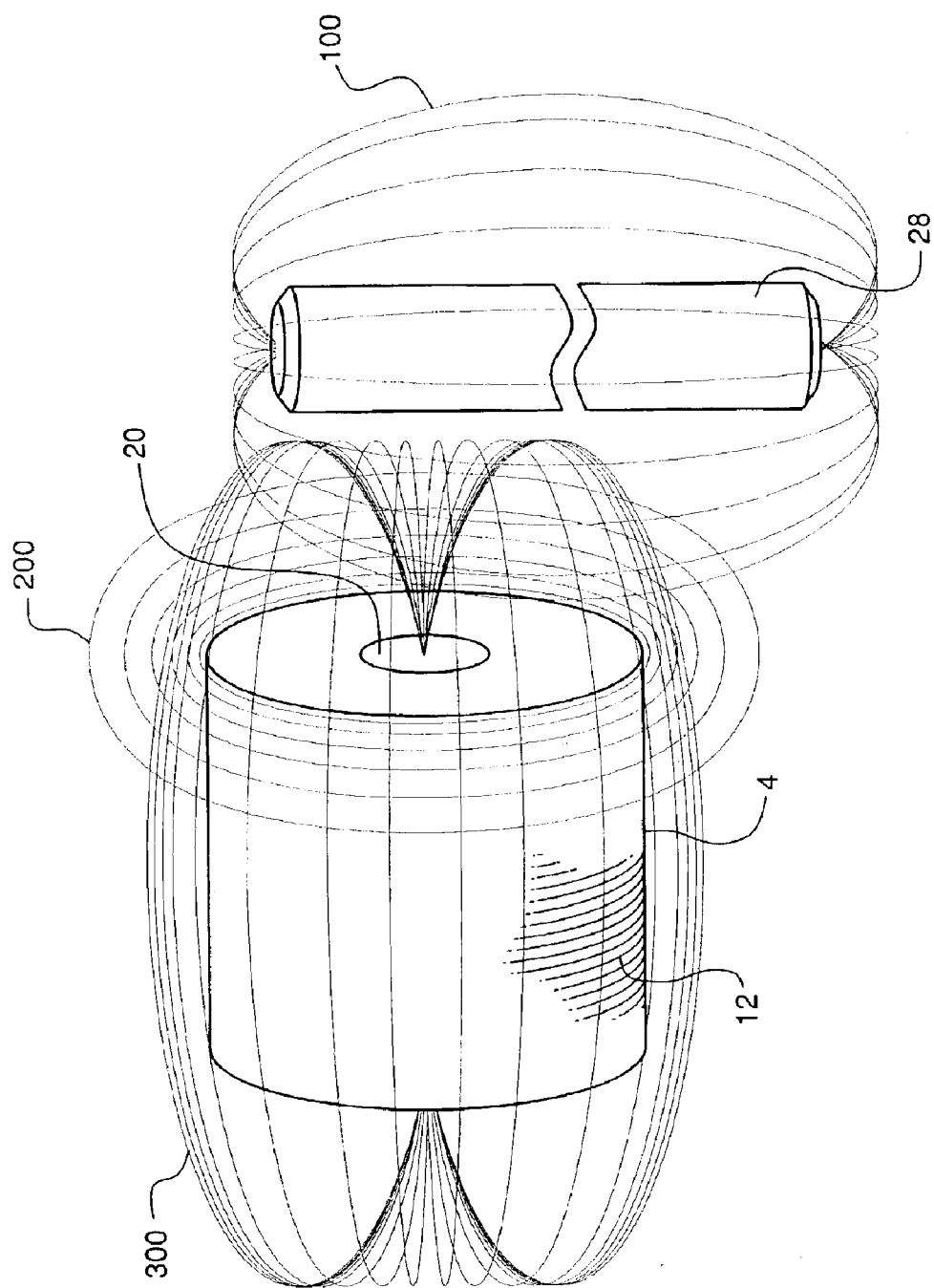
FIG. 3 is an explanatory view, showing the generation of flux lines which forms the basis for the operation of the present invention.
Figure 4:
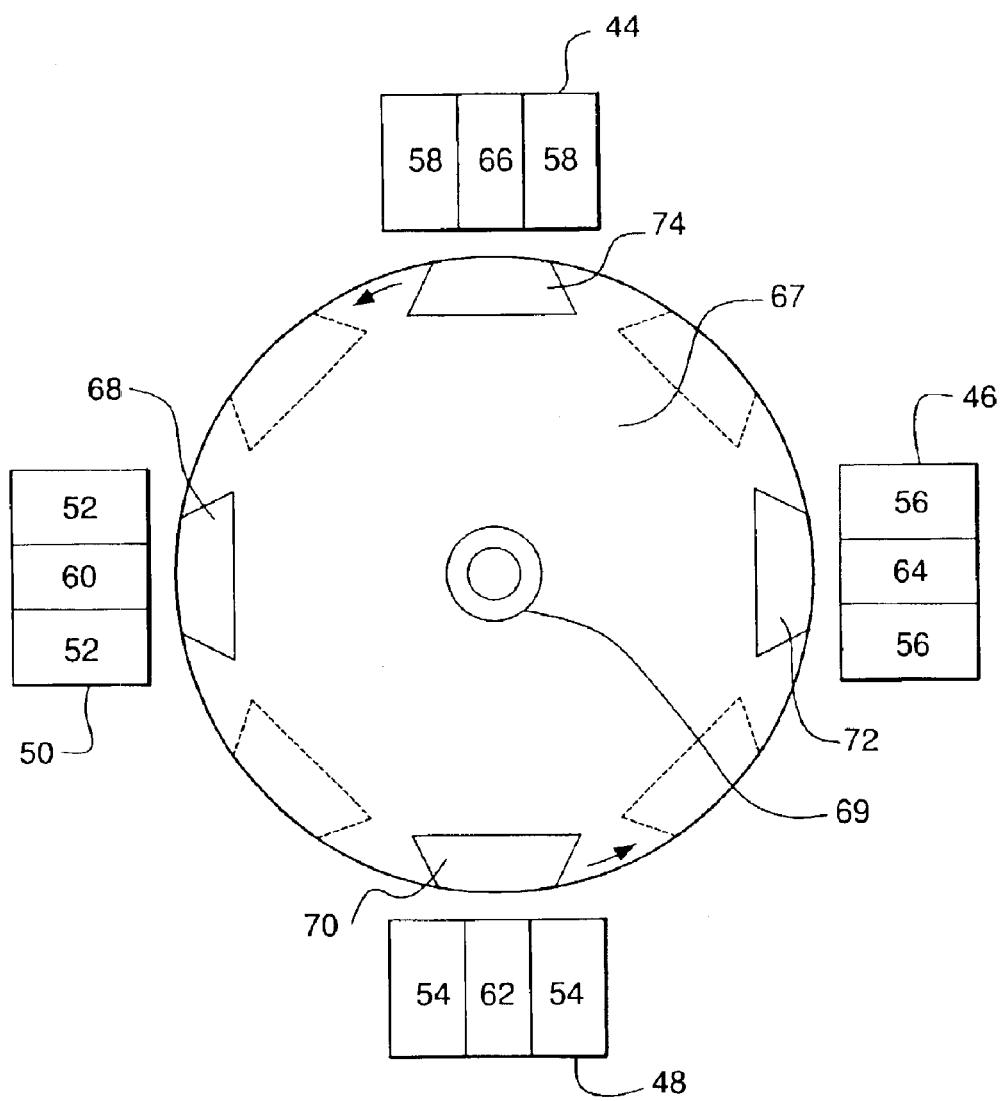
FIG. 4 is an alternate embodiment of the present invention.

FIG. 3 illustrates an alternate embodiment of the invention to that which is shown in FIG. 1. As shown in FIG. 3, coil element 44 with outer windings 58 and inner steel core 66, coil element 46 with windings 56 and core 64, coil element 48 with windings 54 and core 62, and coil element 50 with outer windings 52 and core 60 are positioned adjacent to rotor 67, which is mounted on shaft 69. Magnets 68 and 72 are mounted on rotor 67 such that the north poles of the magnets are positioned in spaced relation to coil elements 44, 46, 48 and 50. Magnets 70 and 74 are mounted on rotor 67 such that the south poles of the magnets are also positioned in spaced relation to coil elements 44, 46, 48, and 50. All magnets are fixedly mounted on rotor 67 such that a north pole of one magnet circumferentially follows a south pole of the next magnet in line. The contemplated gap between the magnets and coil element cones is approximately 0.0001 of an inch, although the scope and use of the invention should not be deemed restricted to this distance.

As in the prior embodiment, rotation of magnets 68, 70, 72, and 74, by rotation of shaft 69 and hence rotor 67, causes the flux lines of the magnets to cut cores 60, 62, 64, and 66 of coil elements 44, 46, 48, and 50, eventually resulting in the output of electrical current as previously described.

It is noted that the larger the diameter of rotor 67, the more coil elements can be positioned around the rotor. The greater the number of coil elements, the slower rotor 67 needs to rotate; however, there is a power loss in so doing. In addition, while rotor 67 is shown as being circular, it may be as square in shape or formed of as other appropriate multi-sided configurations.

This unique way of generating electricity allows generation of more electrical power, e.g. anywhere in the range of 4 to 137 times more power, than prior, conventional means. It also has the advantage of obtaining unity power with very little effort.

As evidence of such power gains, reference is made to the below outlined experimental outputs from coils and magnets which produced electric power the conventional way compared with the subject invention. The conventional way of generating power, for purpose of the following experimental outputs, as referenced herein, is accomplished by cutting the wires, not the cores, of the coil's windings with the magnets' flux.

In this regard, proof is also provided that the herein described method of generating electrical power is not affected by Lenz's Law, by reference to the readings obtained by the conventional methods as the rpms and size of the coil increase. With conventional methods, the values do not change linearly, but are less because Lenz's Law restricts the outputs from increasing proportionally to the speed and size of the coil. In comparison, however, in the method of producing power of the subject invention, there is an increase in the readings of V (voltage), I (current), and P (power) which are actually larger than anticipated.

It is also noted that, just like a transformer, when the number of turns ratio is increased, V increases and I decreases, which is exactly what is seen at the various rpm readings for the different size coils. However, they do not increase or decrease proportionally.

Thus, this presents the ideal model for producing electrical power that corresponds to the general law that states that as the speed increases, the voltage will increase proportionally, through the equation V=q (charge)×v (velocity)×B (magnetic field strength). This also holds true for a coil, in that transformers increase proportionally to the turn ratio.

With reference to the voltage outputs for each of the coils, 1100T, 2200T and 5500T, it is seen that they are consistent with the types of voltage outputs for a transformer action. That is to say, as the turn ratio goes up in a transformer so does the voltage. Since the increases in voltage between the number of turns is not exactly 2 to 5 times, one can pick any one of the coils and assume it is accurate and adjust the other coils accordingly. Thus, by fixing the 1100T coil, the other coils become 2837T and 5896T respectfully. By fixing the 2200T coil, the other coils become 853T and 4572T respectfully. And by fixing the 5500T coil, the other coils become 1026T and 2646T respectfully. Also, if the adjustments are made as described here, i.e. that the coils are bigger than originally thought, and they are applied to the voltages for the conventional method of generating power, the voltages do not increase proportionally but are actually smaller than they are supposed to be, additional proof that Lenz's Law has application to conventional generators, but not to the herein invention.

The proportional changes in the voltage relative to speed can also be seen. Thus, considering the 350 RPM speed as accurate, the 1200 RPM and 1300 RPM speeds will adjust to 906 RPM and 1379 RPM respectfully. Considering the 1200 RPM speed as accurate, the 350 RPM and 1300 RPM speed becomes 464 RPM and 1826 RPM respectfully. And finally, considering the 1300 RPM speed as accurate, the 350 RPM and 1200 RPM speeds become 330 RPM and 854 RPM respectfully.

It is noted that in using the various RPM readings based upon the above, it is seen that, in the conventional way of generating power, there are losses associated with the measured values. The calculated values again show the application of Lenz's Law in the conventional way of generating power, but not to the subject invention. In fact, whether or not there is an adjustment of RPM speed or coil size, the power generation of the subject invention is in no way affected by Lenz's Law.

Since Lenz's Law has no effect in the herein described generator, it can be assumed that the voltages increase proportionally to the speed of the magnets rotation. Therefore, one can extrapolate the expected voltages at 1800 RPM, the speed necessary to create 60 Hz. With regard to the subject generator, for each of the three coils from the 350 RPM, 1200 RPM and 1300 RPM speeds, the following results (values are based on one coil/magnet.):

1. At assumed 350 RPM the voltages range as follows:
   A. 5.863v @1100T
   B. 15.12v @2200T
   C. 31.42v @5500T
2. At assumed 1200 RPM the voltages range as follows:
   A. 4.425v @1100T
   B. 11.295v @2200T
   C. 16.845v @5500T
3. At assumed 1300 RPM the voltages range as follows:
   A. 6.217v @1100T
   B. 10.716v @2200T
   C. 17.668v @5500T The reason the current is not changing linearly as the laws of physics imply from transformers, i.e. as voltage goes up based on the number of turns, the current goes down proportionally to the voltage gain, is due to the fact that the inductive reactance is also going up. See the following chart for the inductive reactances for each coil at each speed.

Impedance (Z) or inductive reactance (X(L)) for a circuit with only a coil in it is the AC voltage divided by the AC current, and the inductance (L) is $Z/2 \times pi \times F$ (frequency). For a circuit with a resistor and a coil Z=square root of R® (resistance) squared+X(L) squared).

The following is the chart of impedance Z for all coil sizes at all speeds for the conventional method of generating power and the method of generating power with the subject invention:

I) For 350 RPMs for 1100T, 2200T and 5500T coils:
   1) (a) Conventional Method (CM): 0.57v/56.6 mA=10.021 ohms=Z (b) Subject Invention (SI): 1.14v/106.6 mA=10.694 ohms=Z
   2) (a) CM: 0.93v/32.4 mA=28.704 ohms=Z (b) SI: 2.94v/70.1 mA=41.94 ohms=Z
   3) (a) CM: 2.09v/17.3 mA=120.81 ohms=Z (b) SI: 6.11v/37.9 mA=161.21 ohms=Z II) 1200 RPMs for 1100T, 2200T and 5500T coils:
   1) (a) CM: 1.45v/60.2 mA=23.387 ohms=Z (b) S: 2.95v/141 mA=20.922 ohms=Z
   2) (a) CM: 3.225v/36.2 mA=89.088 ohms=Z (b) SI: 7.53v/73.5 mA=102.449 ohms=Z
   3) (a) CM: 4.81v/17 mA=282.941 ohms=Z (b) SI: 11.23v/31.4 mA=357.643 ohms=Z III) 1300 RPMs for 1100T, 2200T and 5500T coils:
   1) (a) CM: 1.6v/83 mA=19.27 ohms=Z (b) SI: 4.59v/157 mA=29.236 ohms=Z
   2) (a) CM: 2.75v/50.4 mA=54.455 ohms=Z (b) SI: 7.74v/88.5 mA=87.458 ohms=Z
   3) (a) CM: 5.061v/17.3 mA=292.543 ohms=Z (b) SI: 12.76v/36.4 mA=350.549 ohms=Z IV) 400 RPMs for 2300T coil with 24 gauge wire and ½" core:
   (a) CM: 0.15v/3.7 mA=40.541 ohms=Z
   (b) SI: 2.45v/26.2 mA=93.511 ohms=Z V) Same as #IV above but 1200 RPMs:
   (a) CM: 0.37v/2.7 mA=137.037 ohms=Z
   (b) SI: 4.1v/10.3 mA=398.058 ohms=Z
VI) Same as #IV above but at 1400 RPMs:
   (a) CM: 0.58v/2.4 mA=241.667 ohms=Z
   (b) SI: 8.3v/7.8 mA=1065.385 ohms=Z
VII) Same as #IV above but with ¾" core at 400 RPMs:
   (a) CM: 0.23v/4.2 mA=54.762 ohms=Z
   (b) SI: 0.37v/7.2 mA=51.389 ohms=Z
VIII) Same as #VII above but for 1200 RPMs:
   (a) CM: 0.79v/3.4 mA=232.353 ohms=Z
   (b) SI: 0.43v/6.9 mA=207.246 ohms=Z
IX) Same as #VII above but for 1400 RPMs:
   (a) CM: 0.79v/3.21 A=246.875 ohms=Z
   (b) SI: 2.1v/2.7 mA=777.778 ohms=Z
X) ½" core, 6000T, 28 gauge wire at 400 RPMs:
   (a) CM: 0.49v/2 mA=245 ohms=Z
   (b) SI: 5.48v/0.13 mA=421.538 ohms=Z
XI) Same as #X above but at 1200 RPMs:
   (a) CM: 1.25v/1.5 mA=833.333 ohms=Z
   (b) SI: 15.04v/4.1 mA=3668.293 ohms=Z
XII) Same as #X above but for 1400 RPMs:
   (a) CM: 2.08v/1.1 mA=1890.909 ohms=Z
   (b) SI: 18.76v/2.5 mA=7504 ohms=Z
XIII) ¾" core, 6000T, 28 gauge wire at 400 RPMs:
   (a) CM: 0.64v/1.7 mA=376.471 ohms=Z
   (b) SI: 7.97v/7.4 mA=1077.027 ohms=Z
XIV) Same as #XIII above but at 1200 RPMs:
   (a) CM: 2.08v/1.3 mA=1600 ohms=Z
   (b) SI: 20.4v/5.6 mA=3642.857 ohms=Z
XV) Same as #XIII above but at 1400 RPMs:
   (a) CM: 2.28v/1.2 mA=1900 ohms=Z
   (b) SI: 28.4v/2.1 mA=13523.81 ohms=Z It is noted that, based upon the variations of wire size, core size and number of turns, the following effects take place: (a) the smaller the wire size the higher the gains regardless of speed; (b) the greater the number of turns, generally the higher the gains; and (c) the smaller the core size the higher the gains. However, when comparing coils with smaller cores but a higher number of turns, the effects stay about the same.

Finally, the magnets are placed in the rotor so that they are all north or south poles up or out. A pure half-wave generator is created without rectifying the AC signal, which otherwise must be accomplished in a normal AC generator with electronic components in an electronic circuit.

Experimental Values for Producing Power the Conventional Way and with the Subject Invention I) The results were achieved by using a small 3" magnet with a diameter of ±2" on a 1¼" high coil×1" diameter and ⅜" center/core of steel. (Unknown wire gauge size.)
   a) Conventional method of generating electricity:
   1) 0.324volts
   2) 2.782 mA (milli-amps)
   3) 0.9014 mW (milli-watts)
   b) Subject invention method of generating electricity:
   1) 7.12volts
   2) 17.35 mA
   3) 100.87 mW
   c) Associated gains of Volts, Current and Watts:
   1) 21.98 over conventional voltage output.
   2) 6.24 over conventional current output.
   3) 137.13 over conventional power output.

II) The following results show the voltage, current and power outputs for an 1100, 2200 and 5500 turn coil of 20 gauge copper wire that is 6" in length, 3" in diameter with a ¾" core of steel. The results are those taken at 350 rpms, 1200 rpms and 1300 rpms. (Coil windings are 20 gauge copper wire.)

V=voltage, I=current, and P=power

|  | V | I | P |
|---|---|---|---|
| A) 350 RPMs for an 1100 turn coil | | | |
| a) Conventional method: | .57 v | 56.6 mA | 32.3 mW |
| b) Subject invention method: | 1.14 v | 106.6 mA | 121.5 mW |
| c) Associated gains | 2 | 1.883 | 3.766 |
| B) 350 RPMs for a 2200 turn coil | | | |
| a) Conventional method: | .93 v | 32.4 mA | 30.1 mW |
| b) Subject invention method: | 2.94 v | 70.1 mA | 206.1 mW |
| c) Associated gains | 3.161 | 2.164 | 6.84 |
| C) 350 RPMs for a 5500 turn coil | | | |
| a) Conventional method: | 2.09 v | 17.3 mA | 36.2 mW |
| b) Subject invention method: | 6.11 v | 37.9 mA | 231.6 mW |
| c) Associated gains | 2.923 | 2.191 | 6.40 |
| D) 1200 RPMs for an 1100 turn coil | | | |
| a) Conventional method: | 1.45 v | 60.2 mA | 87.3 mW |
| b) Subject invention method: | 2.95 v | 141 mA | 416 mW |
| c) Associated gains | 2.034 | 2.342 | 4.76 |
| E) 1200 RPMs for a 2200 turn coil | | | |
| a) Conventional method: | 3.225 v | 36.2 mA | 116.75 mW |
| b) Subject invention method: | 7.53 v | 73.5 mA | 553.5 mW |
| c) Associated gains | 2.335 | 2.03 | 4.74 |
| F) 1200 RPMs on a 5500 turn coil | | | |
| a) Conventional method: | 4.81 v | 17 mA | 81.77 mW |
| b) Subject invention method: | 11.23 v | 31.4 mA | 352.6 mW |
| c) Associated gains | 2.355 | 1.847 | 4.313 |
| G) 1300 RPMs on an 1100 turn coil | | | |
| a) Conventional method: | 1.6 v | 83 mA | 132.8 mW |
| b) Subject invention method: | 4.59 v | 157 mA | 704.9 mW |
| c) Associated gains | 2.806 | 1.892 | 5.308 |
| H) 1300 RPMs on a 2200 turn coil | | | |
| a) Conventional method: | 2.75 v | 50.5 mA | 138.9 mW |
| b) Subject invention method: | 7.74 v | 88.5 mA | 685 mW |
| c) Associated gains | 2.815 | 1.752 | 4.933 |
| I) 1300 RPMs on a 5500 turn coil | | | |
| a) Conventional method: | 5.061 v | 17.3 mA | 87.56 mW |
| b) Subject invention method: | 12.76 v | 36.4 mA | 464.5 mW |
| c) Associated gains | 2.52 | 2.1 | 5.3 |

III) The following readings are taken from a coil with 24 gauge wire, ½" center/core or steel and 2300T.

|  | V | I | P |
|---|---|---|---|
| A) 400 rpms | | | |
| a) Conventional method: | .15 v | 3.7 mA | .56 mW |
| b) Subject invention method: | 2.45 v | 26.2 mA | 64.2 mW |
| c) Associated gains | 16.33 | 7.08 | 115.63 |
| B) 1200 rpms | | | |
| a) Conventional method: | .37 v | 2.7 mA | 1 mW |
| b) Subject invention method: | 4.1 v | 10.3 mA | 42.2 mW |
| c) Associated gains | 11.08 | 3.81 | 42.27 |
| C) 1400 rpms | | | |
| a) Conventional method: | .58 v | 2.4 mA | 1.39 mW |
| b) Subject invention method: | 8.31 v | 7.8 mA | 64.82 mW |
| c) Associated gains | 14.33 | 3.25 | 46.57 |

IV) The following readings are taken from a coil made with 24 gauge wire, ¾" center/core of copper, 2300T.

|  | V | I | P |
|---|---|---|---|
| A) 400 rpms | | | |
| a) Conventional method: | .23 v | 4.2 mA | .97 mW |
| b) Subject invention method: | .37 v | 7.2 mA | 2.66 mW |
| c) Associated gains | 1.37 | 1.71 | 2.35 |
| B) 1200 rpms | | | |
| a) Conventional method: | .79 v | 3.4 mA | 2.69 mW |
| b) Subject invention method: | 1.43 v | 6.9 mA | 9.87 mW |
| c) Associated gains | 1.81 | 2.03 | 3.67 |
| C) 1400 rpms | | | |
| a) Conventional method: | .79 v | 3.2 mA | 2.53 mW |
| b) Subject invention method: | 2.1 v | 2.7 mA | 5.67 mW |
| c) Associated gains | 2.66 | .84 | 2.24 |

V) The following readings were taken from a coil made of 28 gauge wire, ½" center/core of steel and 6000T.

|  | V | I | P |
|---|---|---|---|
| A) 400 rpms | | | |
| a) Conventional method: | .49 v | 2 mA | .98 mW |
| b) Subject invention method: | 5.48 v | 13 mA | 71.24 mW |
| c) Associated gains | 11.18 | 6.5 | 72.69 |
| B) 1200 rpms | | | |
| a) Conventional method: | 1.25 v | 1.5 mA | 1.88 mW |
| b) Subject invention method: | 15.04 v | 4.1 mA | 61.66 mW |
| c) Associated gains | 12.03 | 2.73 mA | 32.89 |
| C) 1400 rpms | | | |
| a) Conventional method: | 2.08 v | 1.1 mA | 2.29 mW |
| b) Subject invention method: | 18.76 v | 2.5 mA | 46.9 mW(9) |
| c) Associated gains | 9.02 | 2.27 | 20.5 |

VI) The following readings were taken from a coil made of 28 gauge wire, ¾" steel center/core and 6000T.

|  | V | I | P |
|---|---|---|---|
| A) 400 rpms | | | |
| a) Conventional method: | .64 v | 1.7 mA | 1.09 mW |
| b) Subject invention method: | 7.97 v | 7.4 mA | 58.98 mW |
| c) Associated gains | 12.45 | 4.35 | 54.21 |
| B) 1200 rpms | | | |
| a) Conventional method: | 2.08 v | 1.3 mA | 2.7 mW |
| b) Subject invention method: | 20.4 v | 5.6 mA | 114.24 mW |
| c) Associated gains | 9.81 | 4.31 | 42.25 |

-continued

|  | V | I | P |
|---|---|---|---|
| C) 1400 rpms | | | |
| a) Conventional method: | 2.28 | 1.2 mA | 2.74 mW |
| b) Subject invention method: | 28.4 v | 2.1 mA | 88.04 mW |
| c) Associated gains | 12.46 | 1.75 | 21.8 |

The extrapolated voltages for items III–VI immediately above at the 1800 R.P.M. speed for the method of the subject invention are as follows.

A) 400–1400 R.P.M.s, ½" core, 2300T:
1) 11.025v
2) 6.15v
3) 10.68v

B) 400–1400 R.P.M.s, ¾" core, 2300T:
1) 1.665v
2) 2.145v
3) 2.7v

C) 400–1400 R.P.M.s, ½" core, 6000T:
1) 24.66v
2) 22.56v
3) 24.12

D) 400–1400 R.P.M.s, ¾" core, 6000T:
1) 10.25v
2) 30.6v
3) 36.51v

Some of the readings above do not seem consistent with others. This is attributed to the possibility that the wire connections may have been faulty or the proximity of the magnet relative to the core or coil may not have been the same. This was not taken into account at the time the tests were done.

The following figures are derived based on the premise that the subject invention has characteristics of a transformer when the number of turns on the coils change. In nearly all these situations, the subject invention acts exactly like a transformer, while the conventional way of producing electricity does not.

CM=conventional method; SI=subject invention; ev=expected voltage; av=actual voltage; ei=expected current; ai=actual current; ep=expected power; ap=actual power; evg=expected voltage gain; avg=actual voltage gain; eig=expected current gain; aig=actual current gain; epg=expected power gain; apg=actual power gain.

| | 1100 T to 2200 T | 1100 T to 5500 T | 2200 T to 5500 T |
|---|---|---|---|
| | 350 RPM speed | | |
| CM | ev = 1.14 v | = 2.85 v | = 2.325 v |
| | av = .93 v | = 2.09 v | = 2.09 v |
| | ei = 28.3 mA | = 11.32 mA | = 12.96 mA |
| | ai = 32.4 mA | = 17.3 mA | = 17.3 mA |
| | ep = 32.3 mW | = 32.3 mW | = 30.1 mW |
| | ap = 30.1 mW | = 36.2 mW | = 36.2 mW |
| | evg = 2 | = 5 | = 2.5 |
| | avg = 1.636 | = 3.667 | = 2.247 |
| | eig = .5 | = .2 | = .4 |
| | aig = .572 | = .306 | = .534 |
| | epg = 1 | = 1 | = 1 |
| | apg = .932 | = 1.12 | = 1.203 |
| SI | ev = 2.28 v | = 5.7 v | = 7.35 v |
| | av = 2.94 v | = 6.11 v | = 6.11 v |
| | ei = 53.3 mA | = 42.64 mA | = 28.04 mA |
| | ai = 70.1 mA | = 37.9 mA | = 37.9 mA |
| | ep = 121.74 mW | = 243.05 mW | = 206.09 mW |
| | ap = 206.1 mW | = 231.6 mW | = 231.6 mW |
| | evg = 2 | = 5 | = 2.5 |
| | avg = 2.579 | = 5.36 | = 2.078 |
| | eig = .5 | = .2 | = .4 |
| | aig = .658 | = .356 | = .5407 |
| | epg = 1 | = 1 | = 1 |
| | apg = 1.696 | = 1.906 | = 1.124 |
| | 1200 RPM Speed | | |
| CM | ev = 2.9 v | = 7.25 v | = 8.06 v |
| | av = 3.225 v | = 4.81 v | = 4.81 v |
| | ei = 30.1 mA | = 12.04 mA | = 14.48 mA |
| | ai = 36.2 mA | = 17 mA | = 17 mA |
| | ep = 87.29 mW | = 87.29 mW | = 116.71 mW |
| | evg = 2 | = 5 | = 2.5 |
| | avg = 2.22 | = 3.32 | = 1.49 |
| | eig = .5 | = .2 | = .4 |
| | aig = .6 | = .28 | = .47 |
| | epg = 1 | = 1 | = 1 |
| | apg = 1.34 | = .94 | = .70 |
| SI | ev = 5.9 v | = 14.75 v | = 18.83 v |
| | av = 7.53 v | = 11.23 v | = 11.23 v |
| | ei = 70.5 mA | = 28.2 mA | = 29.4 mA |
| | ai = 73.5 mA | = 31.4 mA | = 31.4 mA |
| | ep = 415.95 mW | = 415.95 mW | = 553.6 mW |
| | ap = 553.5 mW | = 352.6 mW | = 352.6 mW |
| | evg = 2 | = 5 | = 2.5 |
| | avg = 2.55 | = 3.81 | = 1.49 |
| | eig = .5 | = .2 | = .4 |
| | aig = .52 | = .22 | = .43 |
| | epg = 1 | = 1 | = 1 |
| | apg = 1.33 | = .85 | = .64 |
| | 1300 RPM speed | | |
| CM | ev = 3.2 v | = 8 v | = 6.88 v |
| | av = 2.75 v | = 5.06 v | = 5.06 v |
| | ei = 41.5 mA | = 16.6 mA | = 20.2 mA |
| | ai = 50.5 mA | = 17.3 mA | = 17.3 mA |
| | ep = 132.8 mW | = 132.8 mW | = 138.98 mW |
| | ap = 138.9 mW | = 87.56 mW | = 87.56 mW |
| | evg = 2 | = 5 | = 2.5 (14) |
| | avg = 1.72 | = 3.16 | = 1.84 |
| | eig = .5 | = .2 | = .4 |
| | aig = .61 | = .21 | = .34 |
| | epg = 1 | = 1 | = 1 |
| | apg = 1.05 | = .66 | = .63 |
| SI | ev = 9.18 v | = 22.95 v | = 19.35 v |
| | av = 7.74 v | = 12.76 v | = 12.76 v |
| | ei = 78.5 mA | = 31.4 mA | = 35.4 mA |
| | ai = 88.5 mA | = 36.4 mA | = 36.4 mA |
| | ep = 720.63 mW | = 720.63 mW | = 685 mW |
| | ap = 685 mW | = 464.5 mW | = 464.5 mW |
| | evg = 2 | = 5 | = 2.5 |
| | avg = 1.69 | = 2.78 | = 1.65 |
| | eig = .5 | = .2 | = .4 |
| | aig = .56 | = .23 | = .41 |
| | epg = 1 | = 1 | = 1 |
| | apg = .95 | = .64 | = .68 |

The following data represents the expected and actual voltage readings for the conventional method of producing voltage and the method of the subject invention. In virtually all circumstances, the herein invention produced more voltage than the conventional method and has gains that are higher than anticipated.

| | | 350 RPM to 1200 RPM | 350 RPM to 1300 RPM | 1200 RPM to 1399 RPM |
|---|---|---|---|---|
| | | 1100 T Coil | | |
| CM | ev = 1.954 v | = 2.117 v | = 1.571 v |
| | av = 1.45 v | = 1.6 v | = 1.6 v |
| | evg = 3.429 | = 3.714 | = 1.083 |

-continued

|     |             |            |            |
| --- | ----------- | ---------- | ---------- |
|     | avg = 2.544 | = 2.807    | = 1.103    |
| SI  | ev = 3.909 v | = 4.234 v | = 3.196 v  |
|     | av = 2.95 v | = 4.59 v   | = 4.59 v   |
|     | evg = 3.429 | = 3.714    | = 1.083    |
|     | avg = 2.579 | = 4.026    | = 1.556    |
|     | 2200 T coil |            |            |
| CM  | ev = 3.189 v | = 3.454 v | = 3.494 v  |
|     | av = 3.225 v | = 5.061 v | = 5.061 v  |
|     | evg = 3.429 | = 3.714    | = 1.083    |
|     | avg = 3.468 | = 2.957    | = .853     |
| SI  | ev = 10.081 v | = 10.919 v | = 8.157 v |
|     | av = 7.53 v | = 7.74 v   | = 7.74 v   |
|     | evg = 3.429 | = 3.714    | = 1.083    |
|     | avg = 2.561 | = 2.633    | = 1.028    |
|     | 5500 T coil |            |            |
| CM  | ev = 7.167 v | = 7.62 v  | = 5.211 v  |
|     | av = 4.81 v | = 5.061 v  | = 5.061 v  |
|     | evg = 3.429 | = 3.714    | = 1.083    |
|     | avg = 2.301 | = 2.422    | = 1.052    |
| SI  | ev = 20.951 v | = 22.693 v | = 12.166 v |
|     | av = 11.23 v | = 12.76 v | = 12.76 v  |
|     | evg = 3.429 | = 3.714    | = 1.083    |
|     | avg = 1.838 | = 2.088    | = 1.049    |

| 400 RPM to 1200 RPM | 400 RPM to 1400 RPM | 1200 RPM to 1400 RPM |
| --- | --- | --- |
| ½" core, 2300 T coil, 24 gauge wire: | | |
| CM  ev = .45 v | = .525 v | = .432 v |
|      av = .37 v | = .58 v | = .58 v |
|      evg = 3 | = 3.5 | = 1.167 |
|      avg = 2.467 | = 3.867 | = 1.568 |
| SI   ev = 7.35 v | = 8.57 v | = 4.785 v |
|      av = 4.1 v | = 8.31 v | = 8.31 v |
|      evg = 3 | = 3.5 | = 1.167 |
|      avg = 1.673 | = 3.392 | = 2.027 |
| ¾" core, 2300 T coil, 24 gauge wire: | | |
| CM  ev = .69 v | = .805 v | = .922 v |
|      av = .79 v | = .79 v | = .79 v |
|      evg = 3 | = 3.5 | = 1.167 |
|      avg = 3.435 | = 3.435 | = 1 |
| SI   ev = 1.11 v | = 1.295 v | = 1.668 v |
|      av = 1.43 v | = 2.1 v | = 2.1 v |
|      evg = 3 | = 3.5 | = 1.167 |
|      avg = 3.865 | = 5.676 | = 1.469 |
| ½" core, 6000 T coil, 28 gauge wire: | | |
| CM  ev = 1.47 v | = 1.715 v | = 1.459 v |
|      av = 1.25 v | = 2.08 v | = 2.08 v |
|      evg = 3 | = 3.5 | = 1.167 |
|      avg = 2.551 | = 4.245 | = 1.664 |
| SI   ev = 16.44 v | = 19.18 v | = 17.668 v |
|      av = 15.04 v | = 18.76 v | = 18.76 v |
|      evg = 3 | = 3.5 | = 1.167 |
|      avg = 2.745 | = 3.423 | = 1.247 |
| ¾" core, 6000 T coil, 28 gauge wire: | | |
| CM  ev = 1.92 v | = 2.24 v | = 2.427 v |
|      av = 2.08 v | = 2.28 v | = 2.28 v |
|      evg = 3 | = 3.5 | = 1.167 |
|      avg = 3.25 | = 3.563 | = 2.427 |
| SI   ev = 23.91 v | = 27.895 v | = 23.8 v |
|      av = 20.4 v | = 28.4 v | = 28.4 v |
|      evg = 3 | = 3.5 | = 1.167 |
|      avg = 2.56 | = 3.563 | = 1.392 |

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed is:

1. A generator for providing alternating electrical current comprising:

(a) an independently supported rotating drive shaft;

(b) a plurality of spaced apart magnets extending outwardly from the shaft, the magnets each creating magnetic flux and having a polar end with a particular north or south polarity, said magnets being circumferentially spaced and mounted around the shaft, such that the polar ends of the magnets extend away from and circumferentially around the shaft;

(c) a plurality of stationary coil elements, each said coil element comprising electrical windings wound about substantially the entire coil element, each of said coil elements further comprising a solid metal core with two ends extending substantially through the coil element at the center of the coil element, each element being positioned such that one end of each of the cores is located in spaced, adjacent relation to the magnets, whereby rotation of the shaft causes rotation of the magnets around the shaft and in spaced, adjacent relation to the cores of the coil elements, the magnetic flux of the magnetics cutting the cores of the coil elements, creating alternating current in the coil elements; and (d) a first housing in which some of the plurality of coil elements are mounted and a second housing in which the remainder of the plurality of coil elements are mounted.

2. The generator as in claim 1 wherein the magnets are spaced 90° apart around the shaft.

3. The generator as in claim 1 wherein magnets with north polar ends alternate with the magnets with south polar ends in spaced, circumferential relation around the shaft.

4. The generator as in claim 1 wherein all the plurality of magnets are magnets with the same polar ends.

5. The generator as in claim 1 wherein the magnets are equidistantly spaced around the shaft.

6. The generator as in claim 1 wherein the plurality of magnets is rotated by the drive shaft between and in spaced apart relation with the housings.

7. The generator as in claim 1 further comprising four magnets extending from the shaft, adjacent magnets being positioned perpendicular to each other, each magnet having either an outwardly extending north or south polar end, and said magnets being positioned such that a north polar end magnet follows a south polar end magnet, in spaced, circumferential relation around the shaft.

8. The generator as in claim 1 further comprising multiple north polar end magnets and multiple south polar end magnets extending from the shaft, said magnets being positioned in spaced, circumferentially relation around the shaft.

9. The generator as in claim 1 in which the shaft is positioned within a rotor and the magnets are circumferentially mounted on the rotor.

10. The generator as in claim 1 in which the shaft is connected to power means for rotating the shaft, whereby upon rotation of the shaft, the magnets are rotated around the shaft in spaced relation to the cores of the coil elements, thereby inducing an alternating electrical field along the length of each of the cores, thereby producing an alternating electric current in the windings of the coil elements.

11. The generator as in claim 10 further comprising means to transmit the alternating electrical current for electrical power usage.

\* \* \* \* \*